United States Patent
Li et al.

(10) Patent No.: US 10,321,115 B2
(45) Date of Patent: Jun. 11, 2019

(54) THREE-DIMENSIONAL DEPTH SENSOR

(71) Applicant: SAMSUNG ELECTRONICS CO., LTD., Suwon-si (KR)

(72) Inventors: Weiming Li, Beijing (CN); Mingcai Zhou, Beijing (CN); Ya Lu, Beijing (CN); Chun Wang, Beijing (CN); Myungjae Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/828,838

(22) Filed: Dec. 1, 2017

(65) Prior Publication Data

US 2018/0160103 A1   Jun. 7, 2018

(30) Foreign Application Priority Data

Dec. 2, 2016  (CN) .......................... 2016 1 1102223
Jan. 23, 2017  (KR) ........................ 10-2017-0010679

(51) Int. Cl.

| | |
|---|---|
| *H04N 13/271* | (2018.01) |
| *G02B 27/09* | (2006.01) |
| *H04N 5/225* | (2006.01) |
| *G01S 17/36* | (2006.01) |
| *G01S 17/89* | (2006.01) |
| *G01S 7/481* | (2006.01) |
| *G02B 5/20* | (2006.01) |
| *H04N 13/254* | (2018.01) |

(52) U.S. Cl.
CPC ......... *H04N 13/271* (2018.05); *G01S 7/4815* (2013.01); *G01S 7/4816* (2013.01); *G01S 17/36* (2013.01); *G01S 17/89* (2013.01); *G02B 5/201* (2013.01); *G02B 5/208* (2013.01); *G02B 27/0977* (2013.01); *H04N 5/2253* (2013.01); *H04N 5/2254* (2013.01); *H04N 13/254* (2018.05)

(58) Field of Classification Search
None
See application file for complete search history.

(56) References Cited

U.S. PATENT DOCUMENTS

| | | | |
|---|---|---|---|
| 6,754,515 B1 * | 6/2004 | Pologe | ............... A61B 5/14552 600/322 |
| 8,217,327 B2 | 7/2012 | Kim | |
| 8,569,700 B2 | 10/2013 | Bikumandla | |
| 2015/0304534 A1 | 10/2015 | Kadambi et al. | |

(Continued)

OTHER PUBLICATIONS

Yong-Hwa Park et al., "Three-dimensional imaging using fast micromachined electro-absorptive shutter", Journal of Micro/Nanolithography, MEMS and MOEMS, vol. 12(2), 023011, Apr.-Jun. 2013 (pp. 023011-1-023011-11, 12 Pages Total).

(Continued)

*Primary Examiner* — Said Broome
(74) *Attorney, Agent, or Firm* — Sughrue Mion, PLLC

(57) ABSTRACT

A three-dimensional (3D) depth sensor may include: a plurality of light sources configured to irradiate light to an object, the light having different center wavelengths; an optical shutter configured to allow reflected light reflected from the object to pass through; and an image sensor configured to filter the reflected light having passed through the optical shutter and detect the filtered light.

12 Claims, 8 Drawing Sheets

(56) References Cited

U.S. PATENT DOCUMENTS

2016/0198147 A1* 7/2016 Waligorski .............. G01S 17/89
348/49

OTHER PUBLICATIONS

John Sell et al., "The XBOX One System on a Chip and Kinect Sensor", Published by the IEEE Computer Society, IEEE Micro, Mar./Apr. 2014, (pp. 44-53).
Wikipedia., "Bayer filter", Wikimedia Foundation, Inc, last edited on Aug. 21, 2017, at 14:54, (8 Pages Total) Retrieved from: https://en.wikipedia.org/w/index.php?title=Bayer_filter&oldid=796540059.

* cited by examiner

THREE-DIMENSIONAL DEPTH SENSOR

CROSS-REFERENCE TO RELATED APPLICATIONS

This application claims priority from Chinese Patent Application No. 201611102223.4, filed on Dec. 2, 2016, in the State Intellectual Property Office (SIPO) of the People's Republic of China and Korean Patent Application No. 10-2017-0010679, filed on Jan. 23, 2017, in the Korean Intellectual Property Office, the disclosures of which are incorporated herein in their entireties by reference.

BACKGROUND

1. Field

The present disclosure relates to a three-dimensional (3D) depth sensor including an optical shutter.

2. Description of the Related Art

Research is underway on various three-dimensional (3D) image acquisition apparatuses for use by a lay person to produce 3D content, as 3D display apparatuses have become more prevalent and a demand thereof has increased. For example, an increasing amount of research has been conducted on 3D cameras, motion capture sensors, laser radars (LADARs), etc., which can acquire spatial information about a distant object.

A 3D depth sensor or a depth camera including an optical shutter may be a sensor using a time-of-flight (TOF) method. The TOF method measures a flight time of light reflected from an object and received by a sensor after having been irradiated to the object. Via the TOF method, the 3D depth sensor may measure the distance to an object by measuring the time of light reflected from the object and returned after having been irradiated from a light source.

The 3D depth sensor may be used in various areas. It may be used as a general motion capture sensor and as a camera for detecting depth information in various industrial areas.

SUMMARY

One or more exemplary embodiments provide a three-dimensional (3D) depth sensor which includes a plurality of light sources and measures distance information to an object by forming an optical shutter and an optical filter, through which light reflected from the object passes, in correspondence with the light sources.

Additional aspects will be set forth in part in the description which follows and, in part, will be apparent from the description, or may be learned by practice of the presented embodiments.

According to an aspect of an embodiment, a three-dimensional (3D) depth sensor may include: a plurality of light sources configured to irradiate light to an object, the light having different center wavelengths; an optical shutter configured to allow reflected light reflected from the object to pass through; and an image sensor configured to filter the reflected light having passed through the optical shutter and detect the filtered light.

The plurality of light sources may include a first light source, a second light source, and a third light source, and the first through third light sources may be configured to substantially simultaneously irradiate the light having the different center wavelengths.

Differences between the different center wavelengths of the light irradiated from the first through third light sources may be between 10 nm and 1,000 nm.

The different center wavelengths of the light irradiated from the first through third light sources may be between 800-900 nm, between 900-1,000 nm, and between 1,000-1,100 nm, respectively.

The optical shutter may include areas configured to respectively allow the reflected light having the different center wavelengths to pass through, the light having been irradiated from the plurality of light sources and reflected from the object.

The plurality of light sources may include a first light source, a second light source, and a third light source which are configured to respectively irradiate the light having the different center wavelengths, and the optical shutter may include a first area, a second area, and a third area which are respectively configured to allow light having different wavelengths to pass through, the different wavelengths corresponding to the different center wavelengths of the light irradiated from the first through third light sources.

The first through third areas of the optical shutter may each have a same shape based on a surface of the optical shutter on which the reflected light is incident.

The first through third areas have a substantially same area size as each other.

The first through third areas of the optical shutter may have different shapes from each other based on a surface of the optical shutter on which the reflected light is incident.

The first area may have a circular shape, the second area may have a first ring shape surrounding the first area, and the third area may have a second ring shape surrounding the second area.

The plurality of light sources may be configured to control intensity and a center wavelength of the light irradiated therefrom based on a magnitude of a driving voltage.

The 3D depth sensor may further include a controller configured to control the plurality of light sources, the optical shutter, and the image sensor.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
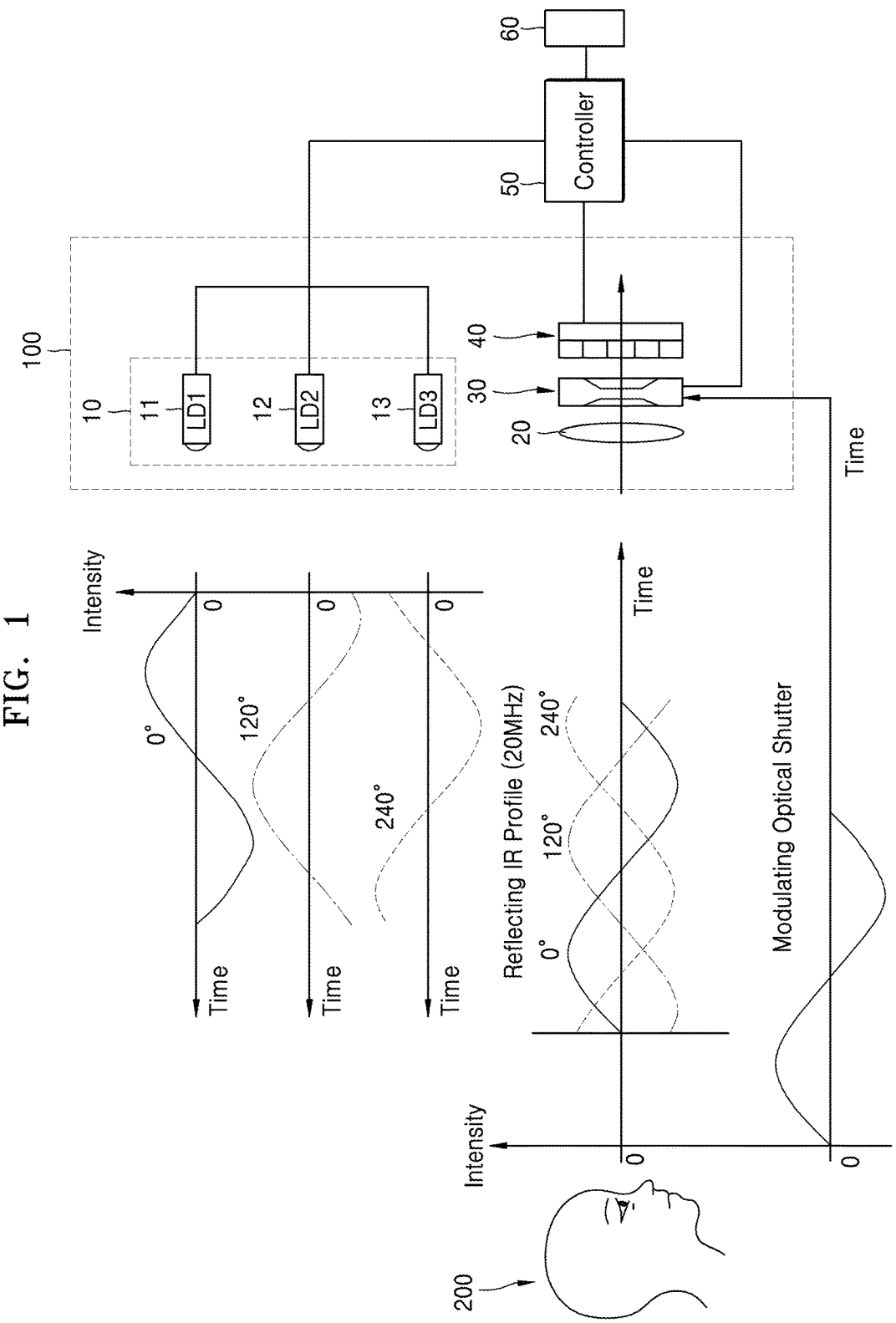
FIG. 1 illustrates a configuration diagram of a three-dimensional (3D) depth sensor and graphs of phases of frequencies used for driving the 3D depth sensor, according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

While this disclosure has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

FIG. 1 illustrates a diagram of a three-dimensional (3D) depth sensor 100 and graphs of phases of frequencies used for driving the 3D depth sensor 100, according to an exemplary embodiment.

Referring to FIG. 1, the 3D depth sensor 100 may irradiate light to an object or subject 200 and may include a light source 10 irradiating light having different center wavelengths. The light source 10 may include a plurality of light sources such as a first light source 11, a second light source 12, and a third light source 13. The first through third light sources 11 through 13 may respectively irradiate light having different center wavelengths and may simultaneously irradiate light to the object 200. The light irradiated from the light source 10 to the object 200 may be reflected from the object 200. In addition, the 3D depth sensor 100 may include a lens 20 receiving light reflected from the object 200, an optical shutter 30, and an image sensor 40.

The light source 10 may include a plurality of individual light sources and may include a light-emitting diode (LED) and/or a laser diode (LD). The light source 10 may irradiate to the object 200 light having wavelengths in a range of infrared (IR) rays or near IR rays. Intensity and a wavelength of light irradiated from the light source 10 may be controlled by adjusting a magnitude of a driving voltage of the light source 10. The light source 10 may include a plurality of individual light sources, such as three light sources 11, 12, and 13 as illustrated in FIG. 1.

The first through third light sources 11 through 13 included in the light source 10 may respectively irradiate light having different center wavelengths to the object 200. For example, the first light source 11 may irradiate light having a center wavelength of about 850 nm (e.g., 800-900 nm), the second light source 12 may irradiate light having a center wavelength of about 950 nm (e.g., 900-1,000 nm), and the third light source 13 may irradiate light having a center wavelength of about 1050 nm (e.g., 1,000-1,100 nm) to the object 200. However, respective ranges of the center wavelengths of light irradiated from the first through third light sources 11 through 13 are not limited thereto. Differences between the center wavelengths of light irradiated from the first through third light sources 11 through 13 may be dozens to hundreds of nanometers (e.g., 10-1000 nm). As described above, the intensity and the center wavelengths of light irradiated from the first through third light sources 11 through 13 may be controlled in accordance with the magnitude of the driving voltage applied to the first through third light sources 11 through 13.

The light irradiated from the light source 10 may be reflected from a surface of the object 200. For example, respective light irradiated from the first through third light sources 11 through 13 may be reflected from surfaces of clothes or skin of the object 200. Light having different center wavelengths irradiated from the first through third light sources 11 through 13 may be simultaneously irradiated on the object 200. Depending on a distance between the light source 10 and the object 200, phase differences may occur between the light irradiated from the first through third light sources 11 through 13 and the light reflected from the object 200.

Respective rays of light irradiated from the first through third light sources 11 through 13 may be reflected from the object 200, and the light reflected from the object 200 may pass through the lens 20 and be incident on the optical shutter 30. The lens 20 may include a transparent material and condense the light reflected from the object 200. In addition, the light condensed by the lens 20 may be transmitted to the optical shutter 30 and the image sensor 40. The optical shutter 30 may be arranged with the lens 20 on a path in which the light irradiated from the first through third light sources 11 through 13 is reflected from the object 200 and proceeds. The optical shutter 30 may change transmittance and a waveform of the reflected light. The optical shutter 30 may change a level of the transmittance of the light reflected from the object 200 and modulate the waveform of the light reflected from the object 200. The light irradiated from the first through third light sources 11 through 13 may be modulated by applying a certain frequency and the optical shutter 30 may be driven by a frequency that is the same as the certain frequency. A form of the reflected light modulated by the optical shutter 30 may change in accordance with the phase of light incident on the optical shutter 30.

In FIG. 1, graphs illustrate profiles of intensity changes over time of light irradiated from the light source 10 including the first through third light sources 11 through 13 to the object 200, an intensity change over time of the light reflected from the object 200, and a change over time of transmittance of light by the optical shutter 30.

The image sensor 40 of the 3D depth sensor 100 may include various kinds of image detecting sensors. For example, the image sensor 40 may include a complementary metal oxide semiconductor (CMOS) image sensor or a charge coupled device (CCD). However, the present disclosure is not limited thereto. In addition, the image sensor 40 may include a color filter.**

In addition, a controller 50 may be located outside the light source 10 including the first through third light sources 11 through 13, the optical shutter 30, and the image sensor 40 of the 3D depth sensor 100, according to the present disclosure. The controller 50 may calculate a phase of light that has been reflected from the object 200, detected and measured by the image sensor 40, and calculate depth information (i.e., distance information) of the object 200. In addition, the controller 50 may display the depth information of the object 200 on a display unit 60 for visual presentation to a user. Together with the controller 50 and the display unit 60, the 3D depth sensor 100 according to the present disclosure may constitute a 3D depth sensing system. In addition, the 3D depth sensor 100 according to the present disclosure may be used in various electronic devices, controlled by a controller of an electronic device, and may display the depth information of the object 200 via a display of an electronic device. The controller 50 may be a processor, such as a central processing unit (CPU), an application-specific integrated circuit (ASIC), and a system on chip (SoC).

Figure 2:
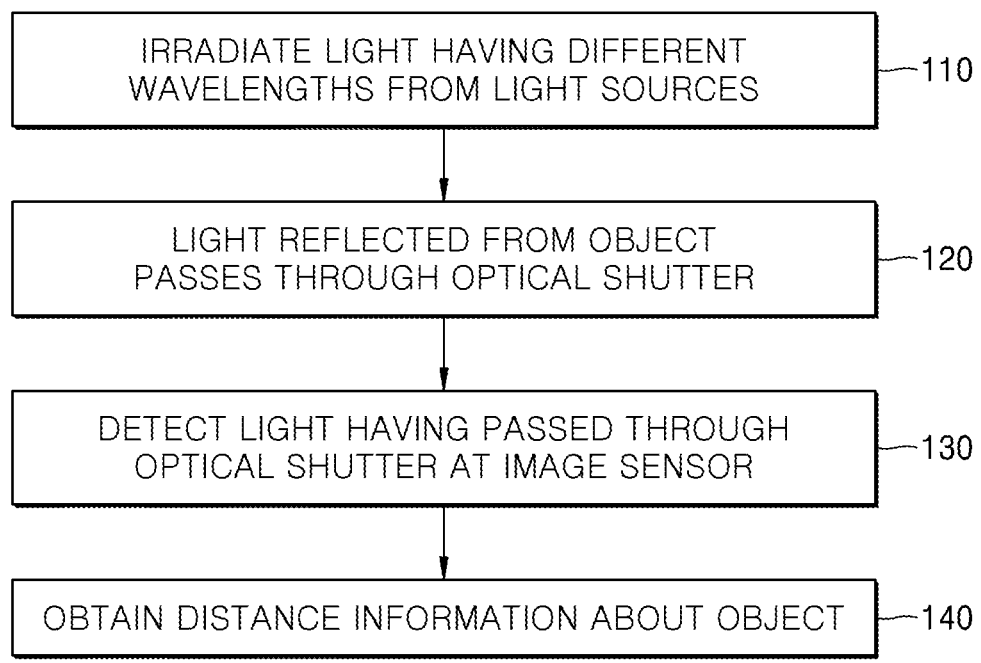
FIG. 2 is a flowchart of a method of driving the 3D depth sensor, according to an exemplary embodiment.

FIG. 2 is a flowchart of a method of driving the 3D depth sensor 100, according to an exemplary embodiment.

Referring to FIGS. 1 and 2, the first through third light sources 11 through 13 may simultaneously irradiate light having different center wavelengths, respectively, to the object 200 (S110). Respective rays of light irradiated from the first through third light sources 11 through 13 may have different center wavelengths from each other and different phases from each other.

Respective rays of light irradiated from the first through third light sources 11 through 13 and reflected from the object 200 may independently pass through the lens 20 and the optical shutter 30 (S120). In FIG. 1, the transmittance of the optical shutter 30 is illustrated as changing over time. In addition, the transmittance of the optical shutter 30 may change depending on the level of a bias voltage applied to the optical shutter 30 in a particular wavelength range. Accordingly, the reflected light reflected from the object 200 may have a waveform thereof modulated while passing through the optical shutter 30. The modulated waveform of the reflected light may depend on phases of the reflected light and the transmittance change of the optical shutter 30 over time. Light that has passed through the optical shutter 30 may be detected by the image sensor 40 (S130). The image sensor 40 may detect phase differences between the reflected light and the irradiated light irradiated from the first through third light sources 11 through 13 by detecting the reflected light that has been modulated by the optical shutter 30.

The waveform change of the reflected light reflected from the object 200 may depend on phases of the reflected light and the transmittance change over time of the optical shutter 30. As a result, the controller 50 may obtain the depth information (i.e., distance information) of the object 200 (S140) by controlling the transmittance of the optical shutter 30 and correcting the depth information of the object 200 that has been obtained, in accordance with driving characteristics of the optical shutter 30.

Figure 3:
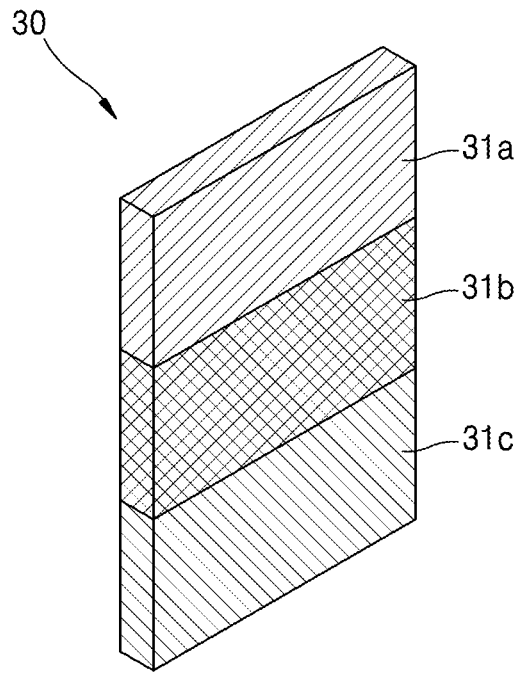
FIG. 3 is a diagram of an example of an optical shutter of the 3D depth sensor, according to an exemplary embodiment.

FIG. 3 is a diagram of an example of the optical shutter 30 of the 3D depth sensor 100, according to an exemplary embodiment.

Referring to FIGS. 1 and 3, respective rays of light irradiated from the first through third light sources 11 through 13 of the 3D depth sensor 100 may be reflected from the object 200 and the light reflected from the object 200 may pass through the lens 20 and be incident on the optical shutter 30. The optical shutter 30 may include a first area 31a, a second area 31b, and a third area 31c corresponding to the reflected rays of light respectively irradiated from the first through third light sources 11 through 13, reflected from the object 200, and incident on the optical shutter 30. The first through third areas 31a through 31c of the optical shutter 30 may change the transmittance and the waveforms of the reflected light. The optical shutter 30 may modulate the waveforms of the light reflected from the object 200 by varying levels of transmittance of the light reflected from the object 200. The reflected light irradiated from the first through third light sources 11 through 13 to the object 200 and reflected from the object 200 may be modulated by applying a certain frequency thereto, and the optical shutter 30 may be driven by a frequency that is the same as the certain frequency. The shape of the reflected light modulated by the optical shutter 30 may change in accordance with the phase of the light incident on the optical shutter 30.

Figure 4:
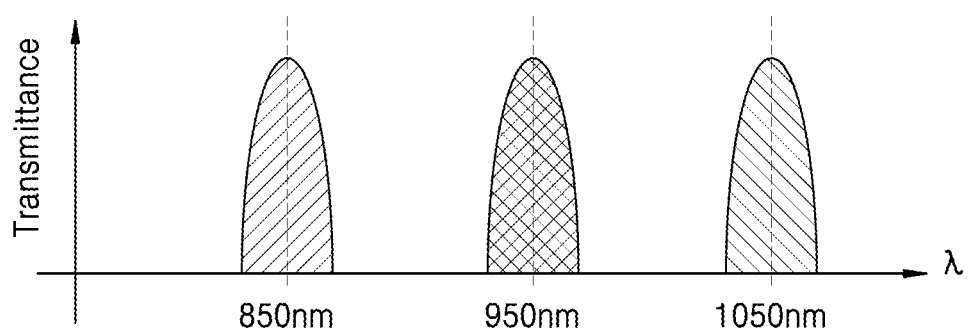
FIG. 4 is a graph of transmittance with respect to wavelengths of incident light of the optical shutter of the 3D depth sensor, according to an exemplary embodiment.

Information about at least three forms of light having different phase information may be needed to obtain the distance information regarding the object 200. To this end, the 3D depth sensor 100 according to the present disclosure may use the first through third light sources 11 through 13 respectively having different center wavelengths. In addition, the optical shutter 30 may include the first through third areas 31a through 31c so as to correspond to respective wavelengths of light irradiated from the first through third light sources 11 through 13. In the case when the light source 10 includes three individual light sources, that is, the first through third light sources 11 through 13, the optical shutter 30 may include three areas such as the first through third areas 31a through 31c. The first area 31a of the optical shutter 30 may have a narrow bandwidth around the center wavelength of light irradiated from the first light source 11. The second area 31b of the optical shutter 30 may have a narrow bandwidth around the center wavelength of light irradiated from the second light source 12. In addition, the third area 31c of the optical shutter 30 may have a narrow bandwidth around the center wavelength of light irradiated from the third light source 13. In the case when the first through third light sources 11 through 13 of the light source 10 respectively irradiate light having the center wavelengths of about 850 nm (e.g., 800-900 nm), about 950 nm (e.g., 900-1,000 nm), and about 1050 nm (e.g., 1,000-1,100 nm), the centers of the bandwidths of the first through third areas 31a through 31c of the optical shutter 30 may be respectively about 850 nm, about 950 nm, and about 1050 nm as shown in FIG. 4.

Figure 5A:
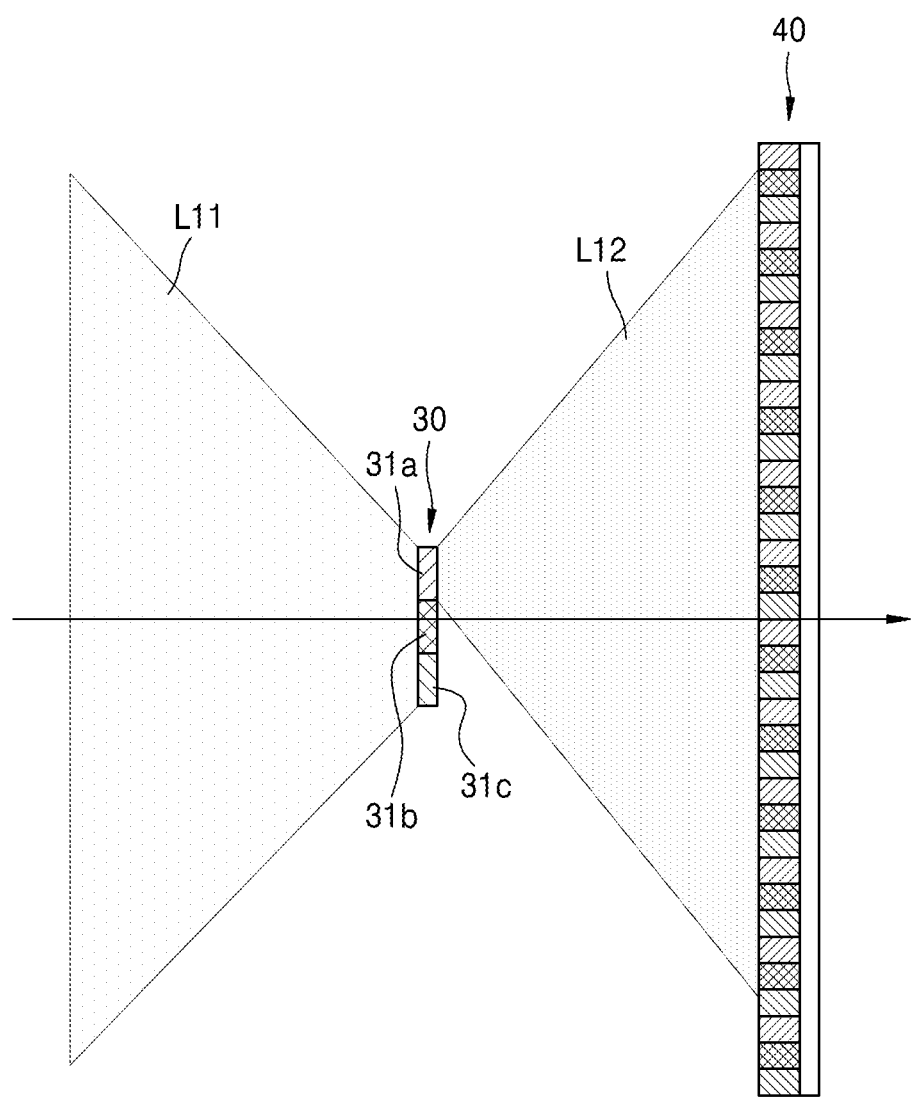
FIGS. 5A through 5C are diagrams illustrating light that enters the optical shutter of the 3D depth sensor and is incident on an image sensor after having passed through the optical shutter, according to an exemplary embodiment.
Figure 5B:
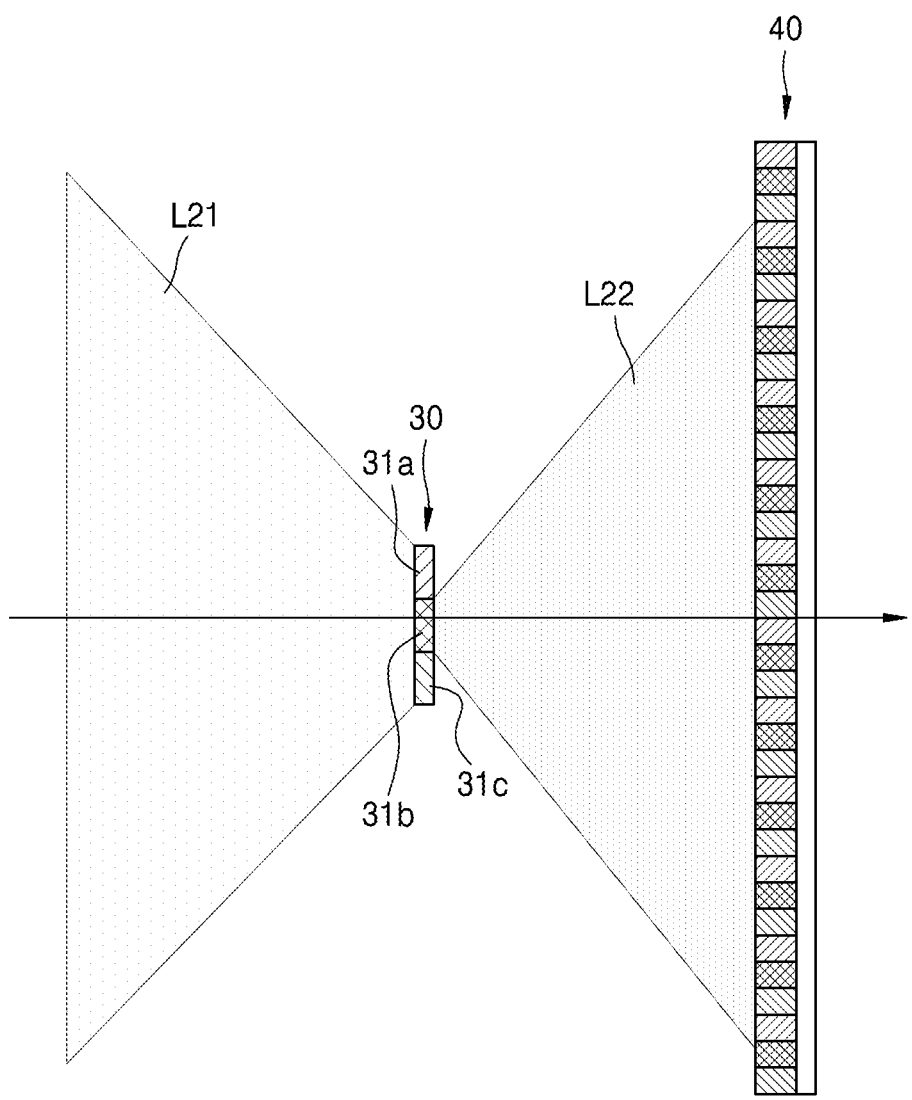
Figure 5C:
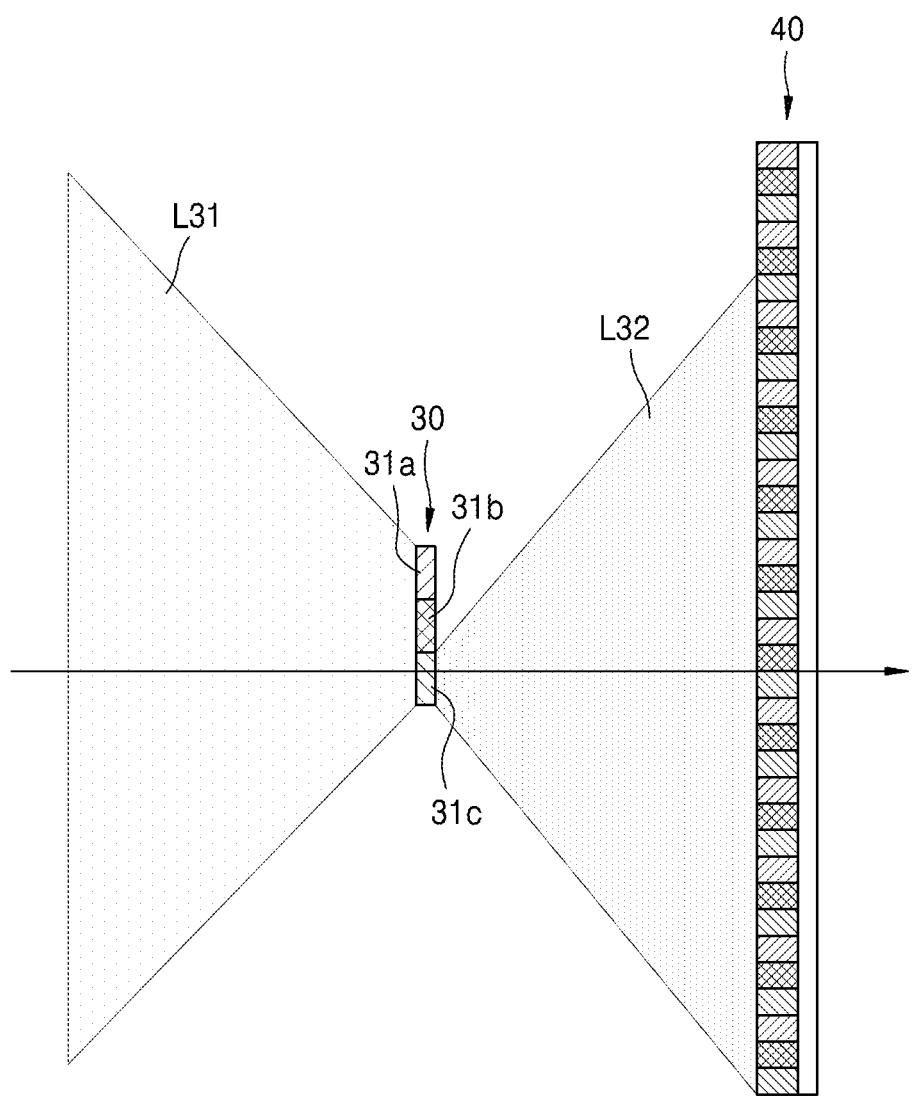

FIGS. 5A through 5C are diagrams illustrating light entering the optical shutter 30 of the 3D depth sensor 100 and incident on an image sensor 40 after having passed through the optical shutter 30, according to the present disclosure.

Referring to FIGS. 1 and 5a through 5c, light respectively irradiated from the first through third light sources 11 through 13 of the light source 10 of the 3D depth sensor 100 may be reflected from the object 200, and reflected light L11 reflected from the object 200 may pass through the lens 20 and be incident on the optical shutter 30, according to the present disclosure. The reflected light L11 includes rays of light having different center wavelengths which have been simultaneously irradiated from the first through third light sources 11 through 13 to the object 200 and reflected from the object 200. The reflected light L11 may be mixed light having different center wavelengths and/or different phases. In addition, reflected light L21 and L31 in FIGS. 5B and 5C may also be the mixed light.

Referring to FIG. 5A, the reflected light, which has been irradiated from the first light source 11 and reflected from the object 200, among the reflected light L11 incident on the optical shutter 30, may pass through the first area 31a of the optical shutter 30 and be incident on the image sensor 40 as incident light L12.

Referring to FIG. 5B, the reflected light, which has been irradiated from the second light source 12 and reflected from the object 200, among the reflected light L21 incident on the optical shutter 30, may pass through the second area 31b of the optical shutter 30 and be incident on the image sensor 40 as incident light L22.

In addition, referring to FIG. 5C, the reflected light, which has been irradiated from the third light source 13 and reflected from the object 200, among the reflected light L31 incident on the optical shutter 30, may pass through the third area 31c of the optical shutter 30 and be incident on the image sensor 40 as incident light L32.

As illustrated in FIGS. 1 and 5A through 5C, according to the present disclosure, the distance information about the object 200 may be obtained after the light irradiated from the light source 10, that is, the first through third light sources 11 through 13 of the 3D depth sensor 100, has been reflected from the object 200 and detected by the image sensor 40. The distance information d regarding the object 200 may be determined by Formulas 1 and 2 below.

$$\varphi_{TOF} = \tan^{-1}\left(\sqrt{3}\frac{I_{240°} - I_{120°}}{2I_{0°} - I_{240°} - I_{120°}}\right) \quad \text{[Formula 1]}$$

$$d = \frac{c}{4\pi f}\varphi_{TOF} \quad \text{[Formula 2]}$$

In Formula 1, $I_{0°}$, $I_{120°}$, and $I_{240°}$ may be intensities of the light irradiated from the first through third light sources 11 through 13. According to the present disclosure, the 3D depth sensor 100 may be a sensor using a time-of-flight (TOF) method, and may measure the distance information about the object 200 via the TOF method.

Figure 6A:
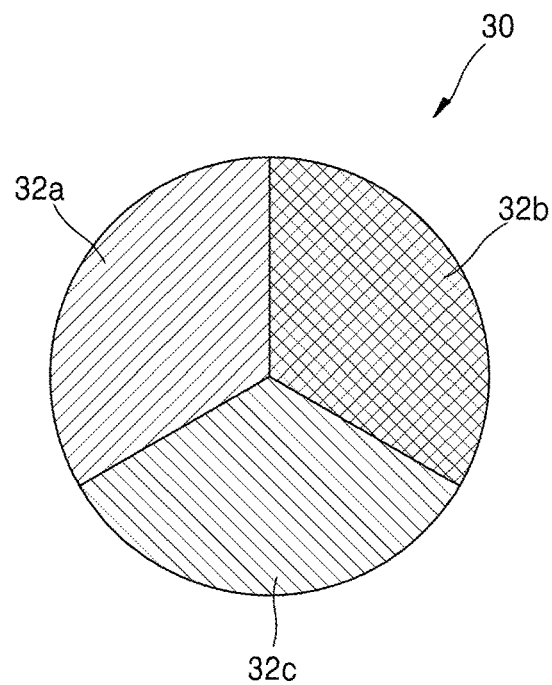
FIGS. 6A through 6C illustrate various examples of the optical shutter of the 3D depth sensor, according to an exemplary embodiment.
Figure 6B:
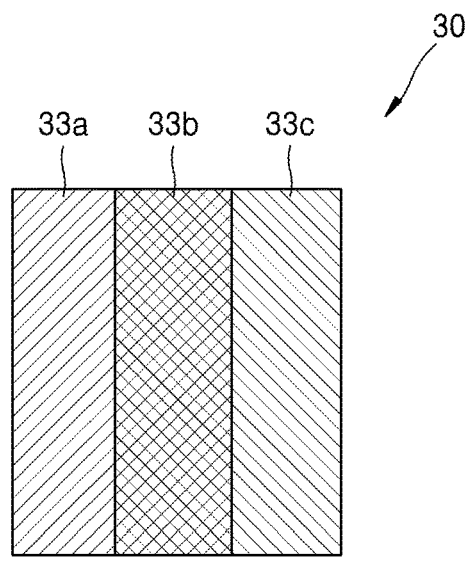
Figure 6C:
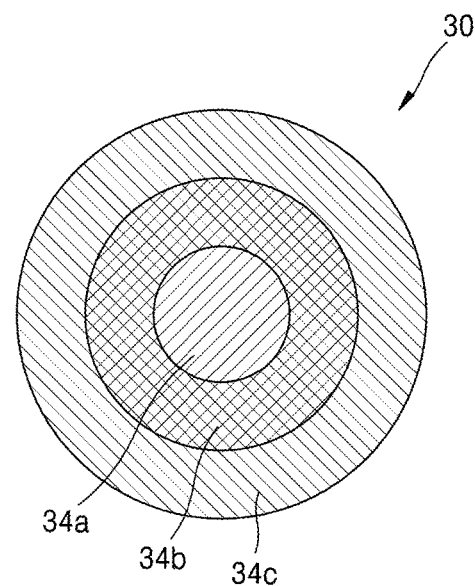

FIGS. 6A through 6C illustrate various examples of the optical shutter 30 of the 3D depth sensor 100, according to an exemplary embodiment. Incident surfaces of the optical shutter 30, on which the reflected light reflected from the object 200 in FIG. 1 is incident, are illustrated. According to the present disclosure, the optical shutter 30 of the 3D depth sensor 100 may be formed in various configurations. In FIG. 3, the optical shutter 30 is formed in a rectangular shape based on a light incident surface and the first through third areas 31a through 31c respectively including structures having the same rectangular shape as each other. However, the embodiment is not limited thereto. Various configurations as illustrated in FIGS. 6A through 6C may be used.

Referring to FIGS. 1 and 6A, the optical shutter 30 of the 3D depth sensor 100 may include a first area 32a, a second area 32b, and a third area 32c, according to the present disclosure. The optical shutter 30 in FIG. 6A is illustrated having the incident surface of a circular shape on which the reflected light from the object 200 in FIG. 1 is incident. The first through third areas 32a through 32c may each have substantially have the same shape and be respectively formed to have conical cross-sectional shapes. According to the present disclosure, the first through third areas 32a through 32c of the optical shutter 30 of the 3D depth sensor 100 may have substantially the same area size.

Referring to FIGS. 1 and 6B, the optical shutter 30 of the 3D depth sensor 100 may include a first area 33a, a second area 33b, and a third area 33c, according to the present disclosure. The optical shutter 30 in FIG. 6B is illustrated having the incident surface of a quadrangular shape on which the reflected light from the object 200 in FIG. 1 is incident. The first through third areas 33a through 33c may have substantially the same shape and be respectively formed to have rectangular shapes. According to the present disclosure, the first through third areas 33a through 33c of the optical shutter 30 of the 3D depth sensor 100 may have substantially the same area.

Referring to FIGS. 1 and 6C, the optical shutter 30 may have the incident surface of a circular shape on which the reflected light from the object 200 is incident. A first area 34a, a second area 34b, and a third area 34c of the optical shutter 30 may have different shapes and/or sizes from each other. The first area 34a may be formed to have a circular shape and the second area 34b may be formed to have a ring shape (e.g., concentric circles) surrounding the circular shape of the first area 34a. In addition, the third area 34c may be formed to have a ring shape surrounding the ring shape of the second area 34b. In FIGS. 3 and 6A through 6B, each of the first through third areas of the optical shutter 30 is illustrated as having substantially the same shape. However, these are only examples and, as illustrated in FIG. 6C, the first through third areas 34a through 34c may have different shapes from each other. Even though the first through third areas 34a through 34c have different shapes from each other, respective areas of the first through third areas 34a through 34c may be substantially the same on the incident surface of the optical shutter 30 on which the reflected light from the object 200 is incident.

Figure 7:
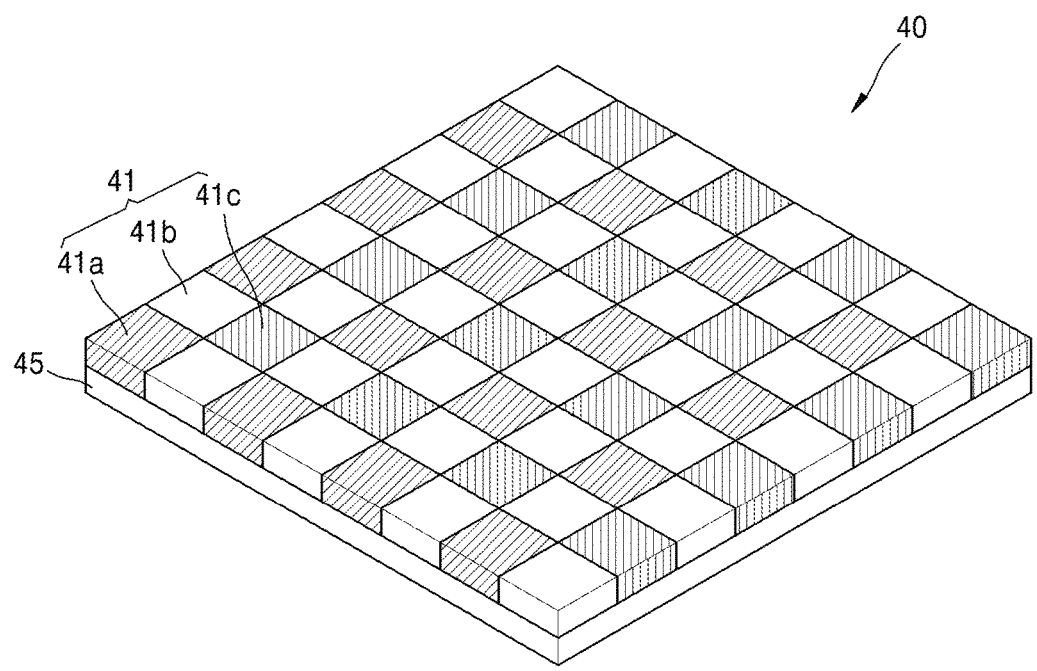
FIG. 7 is a diagram of an example of the image sensor including an optical filter of the 3D depth sensor, according to an exemplary embodiment.

FIG. 7 is a diagram of an example of the image sensor 40 of the 3D depth sensor 100, according to an exemplary embodiment. The image sensor 40 may include an optical filter.

Referring to FIG. 7, the image sensor 40 of the 3D depth sensor 100 may include a filter layer 41 on a sensor array 45, according to the present disclosure. The sensor array 45 may be an array structure including the CMOS image sensor, the CCD, etc. In addition, as illustrated in FIG. 1, the filter layer 40 may include a first area 41a, a second area 41b, and a third area 41c, and each of the first through third areas 41a through 41c may allow only the reflected light to pass through according to respective center wavelengths of light irradiated from the first through third light sources 11 through 13 of the light source 10. For example, when the first through third light sources 11 through 13 of the light source 10 respectively irradiate light having center wavelengths of about 850 nm, about 950 nm, and about 1050 nm, the first area 41a of the filter layer 41 may be formed to transmit only light of about 850 nm among light having wavelengths of about 850 nm, about 950 nm, and about 1050 nm, the second area 41b of the filter layer 41 may be formed to transmit only light of about 950 nm among light having wavelengths of about 850 nm, about 950 nm, and about 1050 nm, and the third area 41c of the filter layer 41 may be formed to transmit only light of about 1050 nm among light having wavelengths of about 850 nm, about 950 nm, and about 1050 nm.

The 3D depth sensor 100 according to the present disclosure may be used in various electronic devices and mobile devices, such as a computer, a desktop computer, a laptop computer, a smartphone, a tablet computer, a wearable computer, etc. The 3D depth sensor 100 as well as independent elements such as the controller 50 and the display 60 may be used in a 3D depth sensor system, along with central processing units and displays of various electronic devices.

A 3D depth sensor according to the present disclosure may include a plurality of light sources respectively irradiating light having different center wavelengths, and may reduce motion blur, which may occur when a single light source is used, by irradiating light from the plurality of light sources to an object. In addition, image information about the object may be obtained at a higher frame rate, and thus, more accurate distance information about the object may be obtained.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A three-dimensional (3D) depth sensor comprising:
a plurality of light sources configured to irradiate light to an object, the light having different center wavelengths;
an optical shutter configured to allow reflected light reflected from the object to pass through; and
an image sensor configured to filter the reflected light having passed through the optical shutter and detect the filtered light,
wherein the plurality of light sources are configured to control intensity and a center wavelength of the light irradiated therefrom based on a magnitude of a driving voltage.

2. The 3D depth sensor of claim 1, wherein the plurality of light sources comprise a first light source, a second light source, and a third light source, and the first through third light sources are configured to simultaneously irradiate the light having the different center wavelengths.

3. The 3D depth sensor of claim 2, wherein differences between the different center wavelengths of the light irradiated from the first through third light sources are between 10 nm and 1,000 nm.

4. The 3D depth sensor of claim 3, wherein the different center wavelengths of the light irradiated from the first through third light sources are between 800-900 nm, between 900-1,000 nm, and between 1,000-1,100 nm, respectively.

5. The 3D depth sensor of claim 1, wherein the optical shutter comprises areas configured to respectively allow the reflected light having the different center wavelengths to pass through, the light having been irradiated from the plurality of light sources and reflected from the object.

6. The 3D depth sensor of claim 5, wherein the plurality of light sources comprise a first light source, a second light source, and a third light source which are configured to respectively irradiate the light having the different center wavelengths, and the optical shutter comprises a first area, a second area, and a third area which are respectively configured to allow light having different wavelengths to pass through, the different wavelengths corresponding to the different center wavelengths of the light irradiated from the first through third light sources.

7. The 3D depth sensor of claim 6, wherein the first through third areas of the optical shutter each have a same shape based on a surface of the optical shutter on which the reflected light is incident.

8. The 3D depth sensor of claim 7, wherein the first through third areas have a substantially same area size as each other.

9. The 3D depth sensor of claim 6, wherein the first through third areas of the optical shutter have different shapes from each other based on a surface of the optical shutter on which the reflected light is incident.

10. The 3D depth sensor of claim 9, wherein the first through third areas have a substantially same area size as each other.

11. The 3D depth sensor of claim 9, wherein the first area has a circular shape, the second area has a first ring shape surrounding the first area, and the third area has a second ring shape surrounding the second area.

12. The 3D depth sensor of claim 1, further comprising a controller configured to control the plurality of light sources, the optical shutter, and the image sensor.

* * * * *